(12) United States Patent
Wang et al.

(10) Patent No.: US 8,015,195 B2
(45) Date of Patent: Sep. 6, 2011

(54) MODIFYING ENTRY NAMES IN DIRECTORY SERVER

(75) Inventors: Chen Wang, Beijing (CN); Zhi Guo Gao, Beijing (CN); Ling Jin, Beijing (CN); Xiao Yan Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 12/109,556

(22) Filed: Apr. 25, 2008

(65) Prior Publication Data
US 2008/0270352 A1 Oct. 30, 2008

(30) Foreign Application Priority Data

Apr. 26, 2007 (CN) .......................... 2007 1 0104774

(51) Int. Cl.
*G06F 17/30* (2006.01)
(52) U.S. Cl. ...................................... 707/758
(58) Field of Classification Search ........................ None
See application file for complete search history.

(56) References Cited

U.S. PATENT DOCUMENTS

| | | | |
|---|---|---|---|
| 6,347,312 B1 | 2/2002 | Byrne et al. | |
| 6,377,948 B2 | 4/2002 | Kikuchi et al. | |
| 6,609,121 B1* | 8/2003 | Ambrosini et al. | 707/763 |
| 6,665,674 B1* | 12/2003 | Buchanan et al. | 1/1 |
| 6,889,247 B2 | 5/2005 | Christie et al. | |
| 7,024,429 B2 | 4/2006 | Ngo et al. | |
| 7,313,581 B1* | 12/2007 | Bachmann et al. | 707/759 |
| 7,840,550 B2* | 11/2010 | Collet et al. | 707/713 |
| 2002/0059329 A1 | 5/2002 | Hirashima et al. | |
| 2002/0129153 A1* | 9/2002 | Fleming | 709/230 |
| 2002/0138489 A1* | 9/2002 | Trivedi et al. | 707/10 |
| 2002/0184230 A1* | 12/2002 | Merrells et al. | 707/102 |
| 2003/0191759 A1* | 10/2003 | Harvey | 707/4 |
| 2004/0002960 A1 | 1/2004 | Drake et al. | |
| 2004/0117386 A1 | 6/2004 | Lavender et al. | |
| 2006/0149760 A1* | 7/2006 | Keni et al. | 707/100 |
| 2007/0073703 A1* | 3/2007 | Quin | 707/10 |

FOREIGN PATENT DOCUMENTS

CN 1399747 A 2/2003

OTHER PUBLICATIONS

"iSeries: Lightweight Directory Access Protocol (LDAP) APIs", Aug. 2005, IBM, Sixth Edition, p. 1-310.* Office Action dated Mar. 3, 2010 for Chinese Counterpart Application No. 200710104774.9.
Mozilla LDAP C SDK Programmer's Guide, source: http://www.mozilla.org/directory/csdk-docs/addmod.htm.
Executing Modify DN operation in directory server, source: http://forum.java.sun.com/thread.jspa?threadID=5063854&messageID=9238811.
Directory Services: Storing Directory Information, server: http://www.samspublishing.com/articles/article.asp?p=28405&seqNum=4&rl=1.

* cited by examiner

*Primary Examiner* — Pierre M Vital
*Assistant Examiner* — Christopher P Nofal
(74) *Attorney, Agent, or Firm* — Jon A. Gibbons; Fleit Gibbons Gutman Bongini & Bianco PL

(57) ABSTRACT

The present invention provides a system and a computer-implemented method for modifying an entry name in a directory database. The method comprises the steps of: modifying, in response to a request for modifying operation of entry names, entry mapping information in accordance with the modification that is requested for modifying operation of entry names, wherein each piece of entry mapping information is used for indicating the correspondence relation between pre-modification entry name information and post-modification entry name information; asynchronously performing modifying operation of a corresponding entry name in accordance with respective pieces of entry mapping information when a predetermined condition for updating the directory database is met.

14 Claims, 8 Drawing Sheets

MODIFYING ENTRY NAMES IN DIRECTORY SERVER

CROSS-REFERENCE TO RELATED APPLICATIONS

This application is based upon and claims priority from prior Chinese Patent Application No. 200710104774.9, filed on Apr. 26, 2007 the entire disclosure of which is herein incorporated by reference in its entirety.

FIELD OF THE INVENTION

The present invention generally relates to database information processing, and in particular, to a method for modifying entry names in a directory server and a related device.

BACKGROUND OF THE INVENTION

A directory server is a special purpose database, which stores a set of information with identical or similar attributes organized in a hierarchical manner. A directory database is always used in applications, such as naming service, user registry, White Page lookup and so forth. For example, the telephone directory database consists of a series of names (either of people names or organization names) organized alphabetically, each name item has attributes such as address, phone number and others.

Since the directory database is designed as read-oriented, it always has relatively high throughput and relatively low latency in search operation workload. In order to improve the performance of search operation of the directory database, various techniques have been developed. However, the modifying or the modifying operation of entry names for the directory database has relatively slower performance than the search operation of the directory database. Although most of operations for the directory database are search operations, the ratio of modifying operations of entry names for the directory database is still as high as 20% in some applications (such as DNS routing, user authentication, telecommunication user management systems and so forth).

In conventional directory server, the latency of modifying operation of entry names is about several ten times higher than that of search operation, and the throughput drops significantly due to poor performance of modifying operation of entry names. Therefore, although the ratio of performing modifying operations of entry names in a directory server are relatively low, the performance of modifying operations has a huge negative influence on the performance of the server.

A lightweight directory access protocol (LDAP) is a protocol used to access online directory services. In the LDAP/X.500 specification are defined the following operations:
Search: {BaseDN, Scope, Filter, Attributes}
ModRDN: {Entry, NewRDN, DelOldRDN, NewSuperior}
Add/Delete/Update Attributes Where ModRDN (Modify DN) operation includes RDN rename operation and migrate operation. For more information about the LDAP/X.500 specification, please refer to RFC 2251 entitled "Lightweight Directory Access Protocol (v3)" and defined by the Internet Engineering Task Force (IETF), which is hereby incorporated by reference in its entirety.

LDAP directory can be implemented using various storage mechanisms, such as flat files, b-tree package and relational database. Most of them utilize designs, such as distinguished name to identifier, identifier to entry and attributes/indices, to transfer a hierarchical data model to a relational-like data model. Due to these designs, the modify operation becomes extraordinarily slow, which especially suffers during the modification to the distinguished name of a directory entry (ModRDN)

TABLE 1-1

| DN2ID |
|---|
| (current node) DN->ID<br>(child nodes) DN->ID list (IDL)<br>(subtree nodes)DN-> ID list (IDL) |

TABLE 1-2

| INDEX |
|---|
| value<br>IDL |

TABLE 1-3

| ID2ENTRY |
|---|
| ID<br>ENTRY |

Tables 1-1, 1-2, 1-3 schematically show an implementation manner of OpenLDAP BDB. In the implementation of OpenLDAP BDB designed using DN2ID, Search operation only needs to perform one DB Read in the DN2ID table. During a ModRDN operation, n DB Writes need to be performed on the DN2ID table and the ID2ENTRY table for a subtree rename operation; and p+q+n DB Writes need to be performed on the DN2ID table and n DB Writes need to be performed on the ID2ENTRY table for a subtree migration operation, wherein n stands for the number of subtree entries affected, and p and q stand for the number of ancestor entries before and after migration respectively.

TABLE 2-1

| RDN2ID |
|---|
| RDN<br>Parent |

TABLE 2-2

| INDEX |
|---|
| Value<br>IDL |

TABLE 2-3

| ID2ENTRY |
|---|
| ID<br>ENTRY |

Tables 2-1, 2-2, 2-3 schematically show an implementation manner of OpenLDAP HDB. In the implementation of OpenLDAP HDB, performance of ModRDN operation is improved. As a result, only one DB Write needs to be performed on the RDN2ID table and n DB Writes need to be performed on the ID2ENTRY table for a subtree Rename operation; and only one DB Write needs to performed on RDN2ID and n DB Writes need to be performed on the ID2ENTRY table for a subtree migration operation. However, such a design that is advantageous to modify entry name operation degrades the performance of Search operation dramatically, the DN2ID table of reference DN needs to be located with O(log$_2$N) complexity, and expensive recursive search for subtree ID lists has to be done.

Apparently, in a conventional directory server, the performance of modify entry name operation is far worse than that of search operation, the relatively low operating efficiency and the relatively poor performance of modify entry name operation will greatly affect the operating efficiency and running performance of the whole directory server. In the implementation of OpenLDAP with the improvement of modify entry name operation, the performance of search operation will be impaired significantly, thereby being unable to achieve satisfying operating efficiency and run time performance of the directory server.

SUMMARY OF THE INVENTION

To solve the problems presented in the prior art, the present invention provides improved performance of modify entry name operation in a directory server, wherein all modify entry name operations in a predetermined period of time are processed asynchronously without affecting the performance of search operations, thereby improving the overall operating efficiency and run time performance of the directory server.

According to a first aspect of the present invention, provided is a method for enabling modifying operation of entry names in a directory database. The method comprises the steps of: modifying, in response to a request for modifying operation of entry names, entry mapping information in accordance with the modification that is requested of entry names, wherein each piece of entry mapping information is used for indicating the correspondence relation between pre-modification entry name information and post-modification entry name information; asynchronously performing modifying operation of a corresponding entry name in accordance with respective pieces of entry mapping information when a predetermined condition for updating the directory database is met.

According to a second aspect of the present invention, provided is a directory server comprising: directory database storage means for storing a directory database; operation processing means for processing a request for operation on the directory database; entry mapping information storage means for storing entry mapping information, wherein each piece of entry mapping information is used for indicating the correspondence relation between pre-modification entry name information and post-modification entry name information; entry mapping maintenance and processing means for modifying, in response to a request for modifying operation of entry names, entry mapping information in accordance with the request for modifying operation of entry names, and for providing entry mapping information to the operation processing means when a preset condition for updating the directory database is met, so as to asynchronously perform modifying operation of a corresponding entry name in accordance with respective pieces of entry mapping information when a predetermined condition for updating the directory database is met.

According to a third aspect of the present invention, provided is a computer program product for implementing the method for enabling modifying operation of entry names in a directory database according to the present invention.

With the present invention, upon receipt of a request for modifying operation of entry names from a user, the directory server does not perform modifying operation of entry names in real time, but temporarily records corresponding entry mapping information and asynchronously performs multiple modifying operations of entry names on the directory database. In this manner, a plurality of modifying operations of entry names can be performed in batch manner in a specific period of time, such as a period of time during which the workload of the directory server is relatively low. The present invention is not intended to improve the performance of each modifying operation of entry names, but to enhance the overall operating efficiency and run time performance of the directory database by asynchronously performing multiple modifying operations of entry names in a batch manner.

Other features and advantages of the present invention will become more apparent from the following detailed description, when taken in conjunction with the accompanying drawings.

BRIEF DESCRIPTION ON THE DRAWINGS

Reference will be made to the following accompanying drawings to explain in detail features and advantages of embodiments of the present invention. If possible, like or similar reference numerals designate the same or similar components throughout the figures thereof and description, in which FIG. 1 shows a flowchart of processing operation on a directory database according to an embodiment of the present invention;

FIG. 2 schematically shows an example of a directory database;

FIG. 5 depicts a flowchart of processing Search operation on a directory database according to an embodiment of the present invention, wherein

Figure 6:
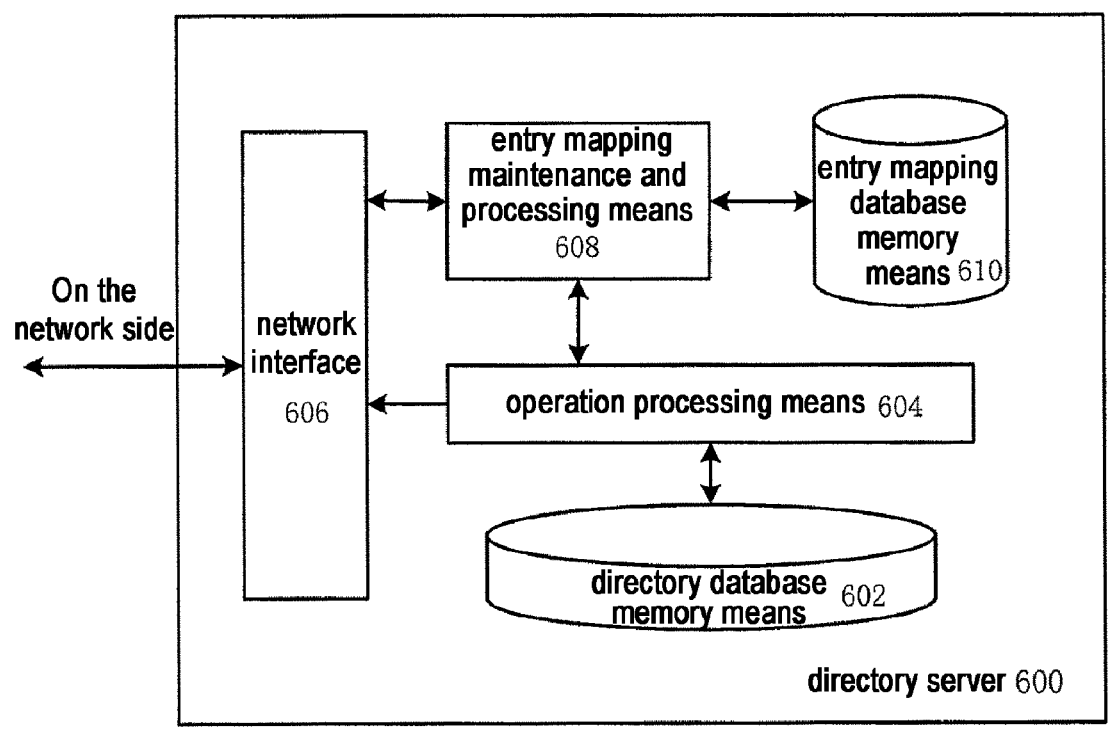
Figure 7:
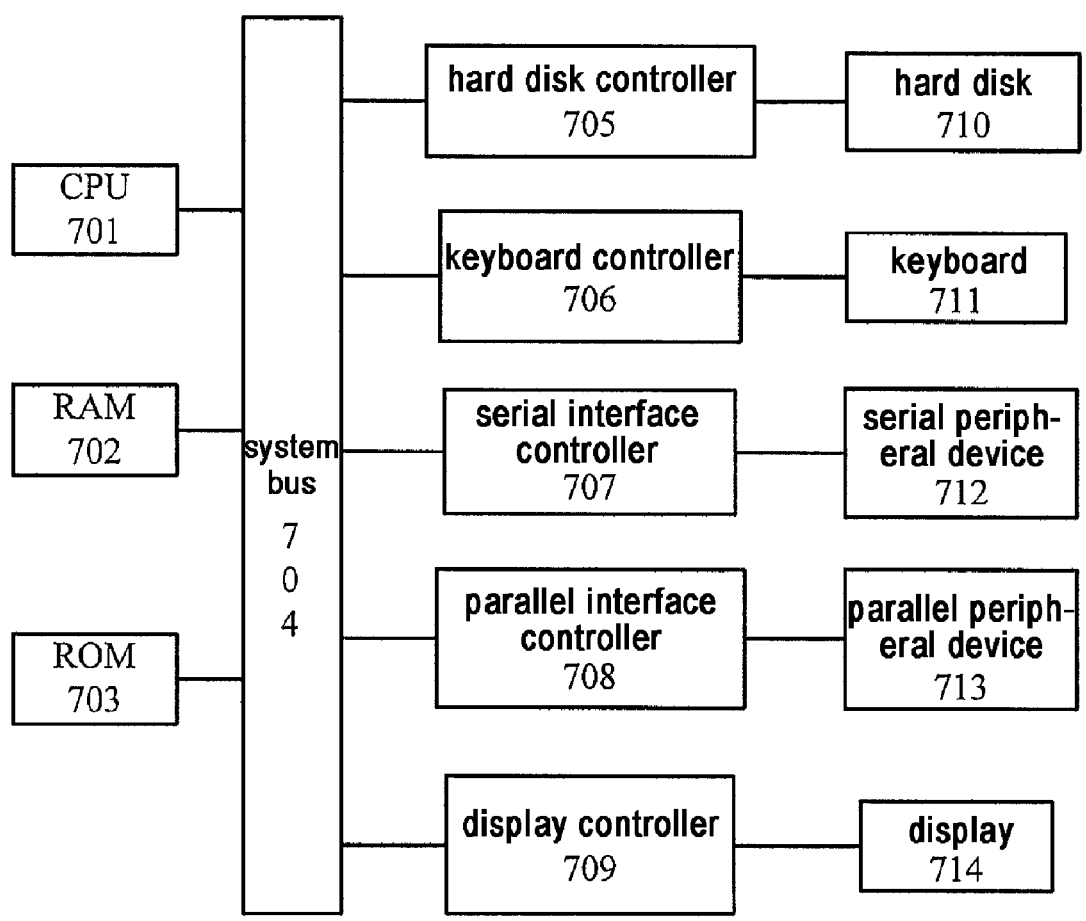

FIG. 6 schematically shows a block diagram of a directory server according to an embodiment of the present invention; and FIG. 7 schematically shows a computer device in which embodiments according to the present invention can be implemented.

DESCRIPTION OF THE PREFERRED EMBODIMENTS

Embodiments of the present invention will be illustrated in detail with reference to the accompanying drawings.

Figure 1:
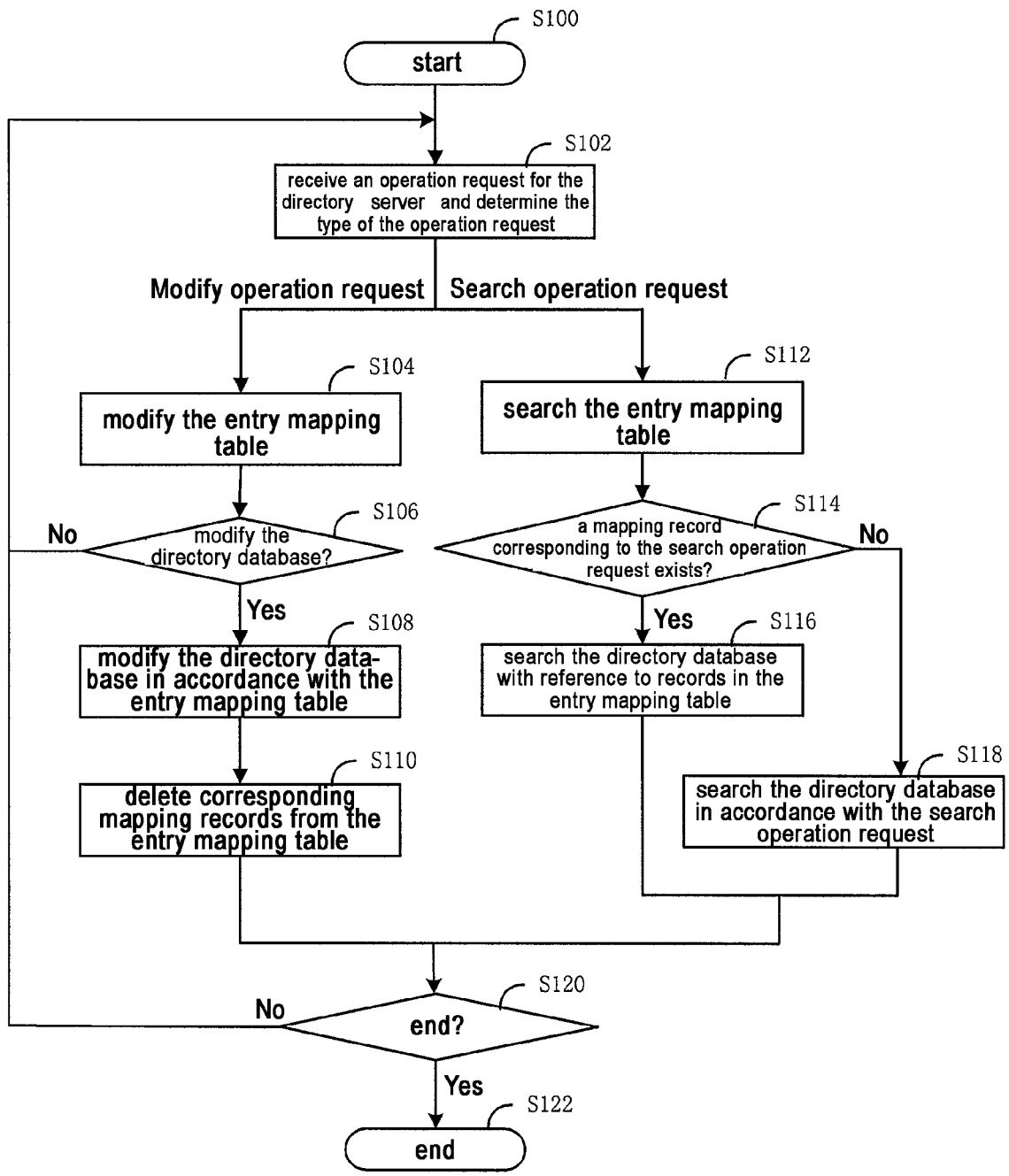

FIG. 1 shows a flowchart of processing directory database operation according to an embodiment of the present invention.

As shown in FIG. 1, this flow starts in step S100.

In step S102, a directory server receives an operation request to a directory database. For example, a user's operation request can be received by a network interface of the directory server via a network.

According to the LDAP/X.500 specification, the requested operation might include: Search operation Search: {BaseDN, Scope, Filter, Attributes}; Modify DN operation ModRDN: {Entry, NewRDN, DelOldRDN, NewSuperior}; and operation on entry attributes, such as Add/Delete/Update attributes. Since operation on entry attributes can be decomposed into Search operation and operation on attributes of searching result entry, processing for operations on entry attributes can be derived from processing on search operation and will not be specially described in this disclosure.

In step S102, an operation request to the directory database is received, and the type of the operation request is determined. When the received operation request is a request for Modify entry name operation, this processing proceeds to perform steps S104 to S110 in which Modify entry name operation is processed; when the received operation request is a Search operation request, this processing proceeds to perform step S112 to S118 in which Search operation is processed.

In step S104, entry mapping data, such as an entry mapping table (illustration will be made in terms of an entry mapping table hereinafter) is modified in accordance with the contents of the request for Modify entry name operation. This entry mapping table records mapping information between original DN before the modification and new DN after the modification. It will be appreciated that various forms can be employed to record entry mapping information before and after the modification. Upon receipt of the request for Modify entry name operation, the directory server does not update the data synchronously, but stores the entry mapping information before and after the modification in a certain form.

TABLE 3

| Post-modification Name | Pre-modification Name | Flag |
|---|---|---|
| (DN or RDN before modification) | (DN before modification) | (Operation nature, current status, etc.) |

Table 3 shows an exemplary entry mapping table. This entry mapping table at least includes a pre-modification name field indicating entry name information before performing Modify entry name operation and an post-modification name field indicating entry name information after performing Modify entry name operation. Alternatively, in order to facilitate the operation and maintenance of this entry mapping table, this entry mapping table may further include a flag field for identifying the nature of a modify entry name operation (for example, whether the modify entry name operation is Rename operation or Migration operation) corresponding to a concerning record and a status of this record.

In step S106, it is determined whether or not the directory database needs to be modified in accordance with the entry mapping data. Depending on different applications, specific modification conditions can be set for making the determination. For example, a certain period of time can be predetermined to serve as a modification condition. For example, the modification is to be performed after 12:00 p.m. Or a certain modification workload threshold can be predetermined to serve as a modification condition. That is, the directory database will be modified upon reaching this modification workload threshold.

In particular, according to an advantageous implementation of the present invention, it can be set if a record corresponding to the entry involved in a current request for Modify entry name operation exists in the entry mapping table, then it is determined the directory database needs to be modified in accordance with current entry mapping data. For example, when a record indicating Migration operation for a certain entry exists in the entry mapping table, and a request is currently made for renaming the same entry, or renaming an ancestor node or a child node of the same entry, it can be determined the directory database needs to be updated mandatorily in accordance with existing records in the entry mapping table, so as to delete the entry which have been updated. In this manner, the complexity of Search operation for the directory database by using the entry mapping table and of asynchronous updating of the directory database by using the entry mapping table will be reduced effectively. It should be pointed out that since the probability of multiple operations of modifying entry names for the same entry in the directory database is very low, such a condition of asynchronously modifying the directory database will not cause the directory server to frequently update the directory database in a short time or decrease the operating efficiency of the directory server.

If the determination result is "no," then the processing goes back to step S102 to continue to receive an operation request to the directory database. If the determination result is "yes," then the processing continues to perform step S108.

In step S108, the directory database is modified in accordance with the record(s) in the entry mapping table. At this moment, the entry mapping table may store a plurality of records, and the directory server modifies corresponding entries in dependence on the implementation of the directory database.

In step S110, corresponding mapping records for which the operations of modifying entry names have been performed are deleted from the entry mapping table.

In step S112, the entry mapping table is searched in accordance with the contents of the search operation request.

In step S114, it is determined whether or not a mapping record corresponding to the search request is found.

If the determination result is "yes," step S116 will be performed; if the determination result is "no," step S118 will be performed.

In step S116, the directory database is searched with the corresponding record in the entry mapping table. Since a mapping record corresponding to the search operation request exists in the entry mapping table, i.e. a request for modifying entry names was previously made with respect to the entry to be currently searched while the directory database has not performed the operation of modifying entry name on request, the pre-modification name of the entry can be obtained in accordance with the record in the entry mapping table, thereby finishing searching the directory database.

In step S118, the directory database is searched directly in accordance with the received search operation request.

In step S120, it is determined whether or not the processing ends.

If the determination result is "no," the processing goes back to step S102 to continue to receive an operation request to the directory database; if the determination result is "yes," the processing continues to perform step S122.

The processing ends in step S122.

Hereinafter, the processing on the two kinds of operation of modify entry names (i.e. Rename operation and Migration operation) and Search operation of the directory database according to an embodiment of the present invention will be described in detail in conjunction with specific examples.

Figure 2:
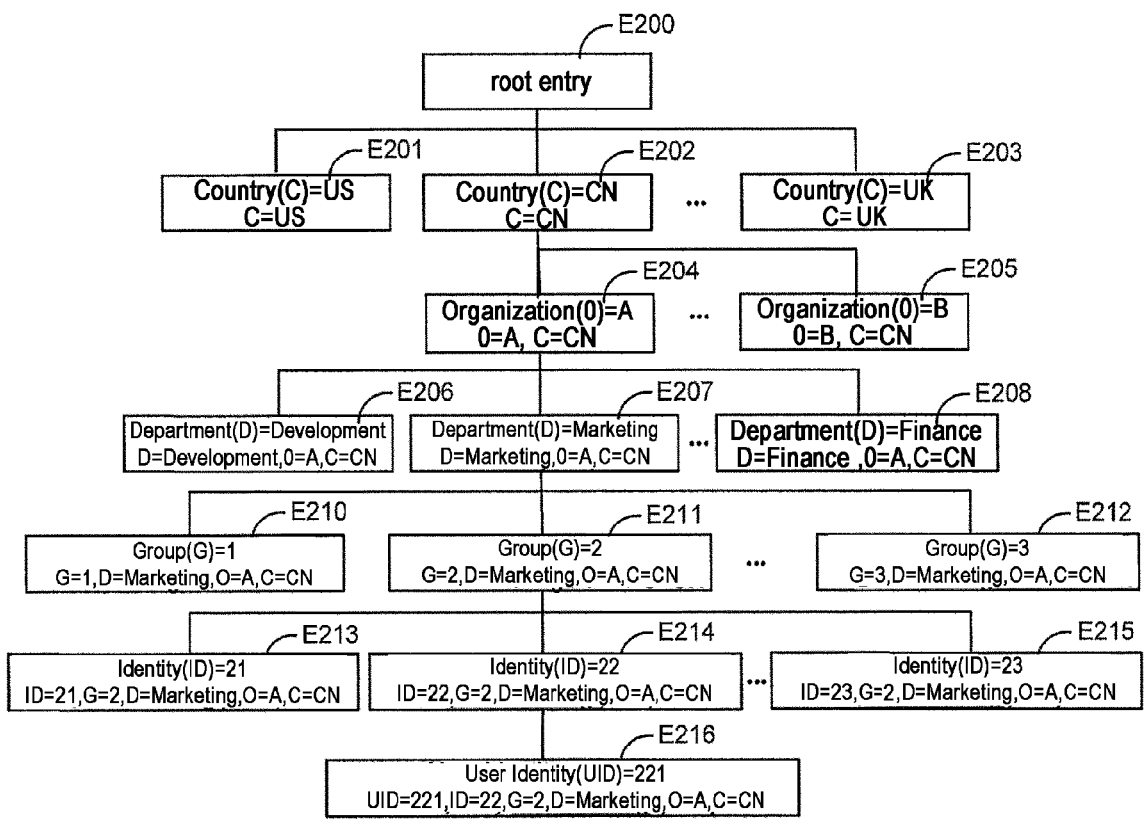

FIG. 2 schematically shows an example of a directory database, wherein the organizational structure of a company as recorded by the directory database is described using a hierarchical layout graph.

As shown in FIG. 2, this directory data consists of six hierarchies, and each node represents an entry in the directory database, and RDN and DN of the entry are shown in the node. Node E200 is a root entry having multiple nodes below it, namely entries E201, E202, E203 and so forth, each of which represents a different country (C). For example, RDN of E202 is C=CN, and its DN is also C=CN since it is a child node of the root entry. Node E201 has multiple children nodes, namely entries E204, E205 and so forth, each of which represents a different organization (O). For example, RDN of entry E204 is O=A, and DN thereof is O=A, C=CN. Likewise, node E204 has multiple children nodes, namely entries E206, E207, E208 and so forth, each of which represents a different department (D); node E207 has multiple children nodes, namely entries E210, E211, E212 and so forth, each of which represents a different group (G); node E211 has multiple children nodes, namely entries E213, E214, E215 and so forth, each of which represents a different identity (ID); node E214 has a child node, namely E216, which represents a user identity (UID).

Figure 3:
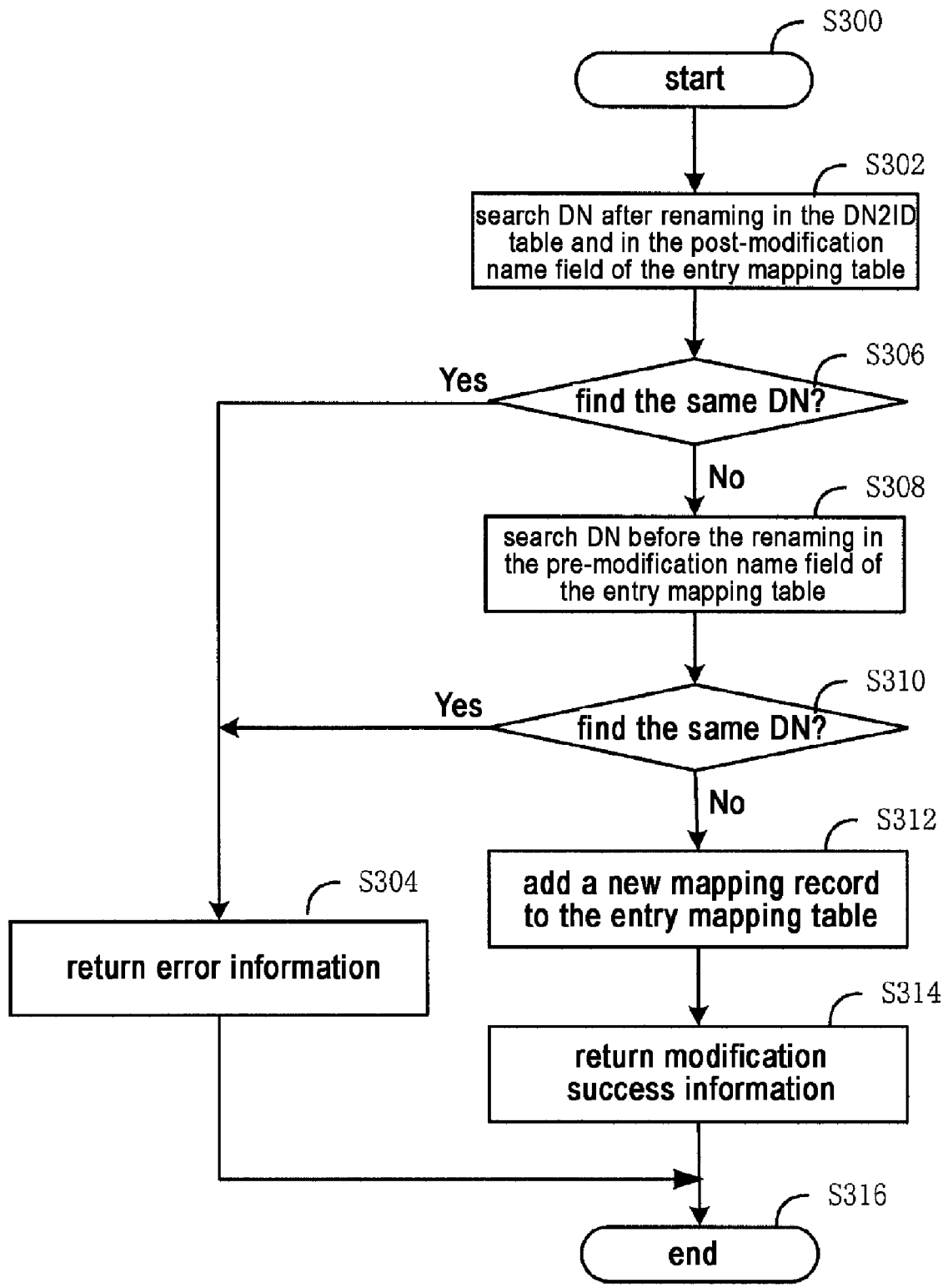
FIG. 3 shows a flowchart of processing (RDN) Rename operation on a directory database according to an embodiment of the present invention.

FIG. 3 schematically shows a flowchart of processing Rename operation of a directory database according to an embodiment of the present invention. As an example, the directory database employs the implementation manner of OpenLDAP BDB (see tables 1-1, 1-2 and 1-3).

As shown in FIG. 3, in step S300, a user needs to perform a operation of modifying entry names, namely renaming the directory database shown in FIG. 2, for example, changing RDN of entry E207 from "D=marketing" to "D=marketing 1." The user inputs a Rename operation request including NewRDN, DelOldRDN with other parameters, and then the processing starts.

In step S302, renamed DN is searched in the DN2ID table and the post-modification name field in the entry mapping table as shown in table 3. The reason is that entries with the same DN could not exist in the directory server. In the prior art with synchronously performing of Modify entry name operation, only the DN2ID table is required to be searched; while in an embodiment according to the present invention, since the entry mapping table stores information associated with entries on which Modify entry name operations have been performed, the entry mapping table is also required to be searched in order to determine the validity of renamed entry DN. It should be pointed out that if the post-modification name field in the entry mapping table merely stores post-modification RDN with respect to Rename operation (as shown in table 4), then post-modification DN containing the post-modification RDN has to be recovered in order to perform the search processing.

In step S306, it is determined whether or not the same DN is found.

If the determination result is "yes," the processing continues to perform S304; if the determination result is "no," the processing continues to perform S308.

In step S304, error information is returned by, for example, sending a message to the user raising the modification request by the network interface of the directory server via the network. Then, the processing continues to perform step S316.

In step S308, DN before the requested Rename operation (i.e., original DN) is searched in the pre-modification name field of the entry mapping table.

In step S310, it is determined whether or not the same DN is found.

If the determination result is "yes," it means that a request was previously made for Modify entry name operation to the entry to be renamed whereas the Modify entry name operation has not been performed on the directory database, then the processing continues to perform step S304 in which error information is returned. If the determination result is "no," it means that no request is made for Modify entry name operation to the entry to be renamed, then the processing continues to perform step S312.

In step S312, a new mapping record is added to the entry mapping table. For example, as shown in table 4, the following new mapping record may be added to the entry mapping table at this point.

TABLE 4

| Post-modification Name | Pre-modification Name | Flag |
|---|---|---|
| D = marketing 1 | D = marketing, O = A, C = CN | 0 |
| ... | ... | ... |

In table 4, the post-modification name field merely records the renamed RDN, and alternatively, the flag field is set as "0" to indicate that the record corresponds to Rename operation. In other embodiments, the post-modification name field may also be a record of renamed DN to indicate name information after performing Modify entry name operation.

In step S314, modification success information is returned by, for example, sending a message to the user making the modification request by the network interface of the directory server via the network.

The processing ends in step S316.

Figure 4:
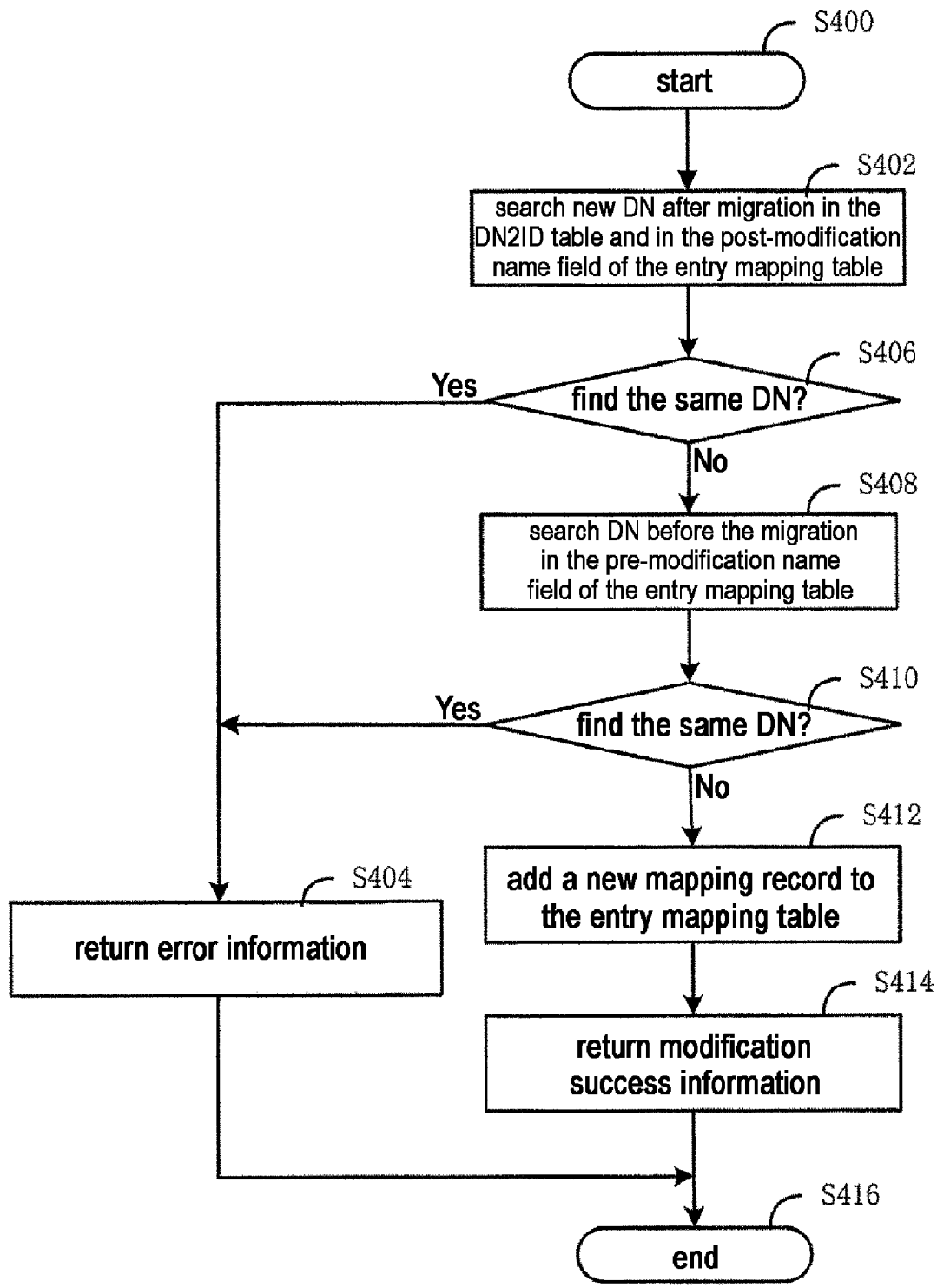
FIG. 4 shows a flowchart of processing (Subtree) Migration operation on a directory database according to an embodiment of the present invention.

FIG. 4 schematically shows a flowchart of processing Migration operation of a directory database according to an embodiment of the present invention. As an example, the directory database employs the implementation manner of OpenLDAP BDB (see tables 1-1, 1-2 and 1-3).

As shown in FIG. 4, in step S400, a user needs to perform the operation of modifying entry names, namely migrating the directory database shown in FIG. 2, for example, migrating entry E214 to new father node E210. The user inputs a Migration operation request including NewSuperior with other parameters, and then the processing starts.

In step 402, the migrated DN is searched in the DN2ID table and the post-modification name field in the entry mapping table as shown in table 3. The reason is that entries with the same DN could not exist in the directory server. In the prior art with synchronous performing modify entry name operation, only the DN2ID table is required to be searched; while in an embodiment according to the present invention, since the entry mapping table stores information associated with entries on which Modify entry name operations have been performed, the entry mapping table is also required to be searched in order to determine the validity of entry DN after migration. It should be pointed out that if the post-modification name field in the entry mapping table merely only stores post-modification RDN with respect to Migrate operation (as shown in table 5), then post-modification DN containing the post-modification RDN has to be recovered in order to perform the search processing.

In step S406, it is determined whether or not the same DN are found.

If the determination result is "yes," the processing continues to perform S404; if the determination result is "no," the processing continues to perform S408.

In step S404, error information is returned by, for example, sending a message to the user making the modification request by the network interface of the directory server via the network. Then, the processing continues to perform step S416.

In step S408, DN before the requested Migrate operation (i.e., original DN) is searched in the pre-modification name field of the entry mapping table. Similarly, if the post-modification name field in the entry mapping table merely only stores post-modification RDN with respect to Migrate operation (as shown in table 5), then post-modification DN containing the post-modification RDN need to be recovered in order to perform the search processing.

In step S410, it is determined whether or not the same DN is found.

If the determination result is "yes," it means that a request was previously made for Modify entry name operation to the entry to be migrated whereas the Modify entry name operation has not been performed on the directory database, then the processing continues to perform step S404 in which error information is returned. If the determination result is "no," it means that no request is made for Modify entry name operation to the entry to be migrated, then the processing continues to perform step S412.

In step S412, a new mapping record is added to the entry mapping table. For example, as shown in table 5, the following new mapping record may be added to the entry mapping table at this point.

TABLE 5

| Post-modification Name | Pre-modification Name | Flag |
| --- | --- | --- |
| ID = 22, G = 1, D = marketing, O = A, C = CN | ID = 22, G = 2, D = marketing, O = A, C = CN | 1 |
| ... | ... | ... |

Optionally, the flag field is set as "1" to indicate that the record corresponds to Migrate operation.

In step S414, modification success information is returned by, for example, sending a message to the user making the modification request by the network interface of the directory server and via the network.

The processing ends in step S416.

It should be pointed out that the flows shown in FIGS. 3 and 4 are based on a specific configuration of the entry mapping table, just like the entry mapping table described in conjunction with FIG. 1. In this configuration of the entry mapping table, it is assumed that if a record corresponding to the entry involved in a current request for Modify entry name operation exists in the entry mapping table, then it is determined the directory database needs to be modified in accordance with current entry mapping data. With such configuration of the entry mapping table, the complexity of search operation for the directory database by using the entry mapping table and of asynchronous updating of the directory database by using the entry mapping table will be reduced significantly. Of course, it will be appreciated that if such specific configuration of the entry mapping table was not employed, then corresponding processing of Rename operation and Migrate operation would become more complex than the flows shown in FIGS. 3 and 4.

Figure 5A:
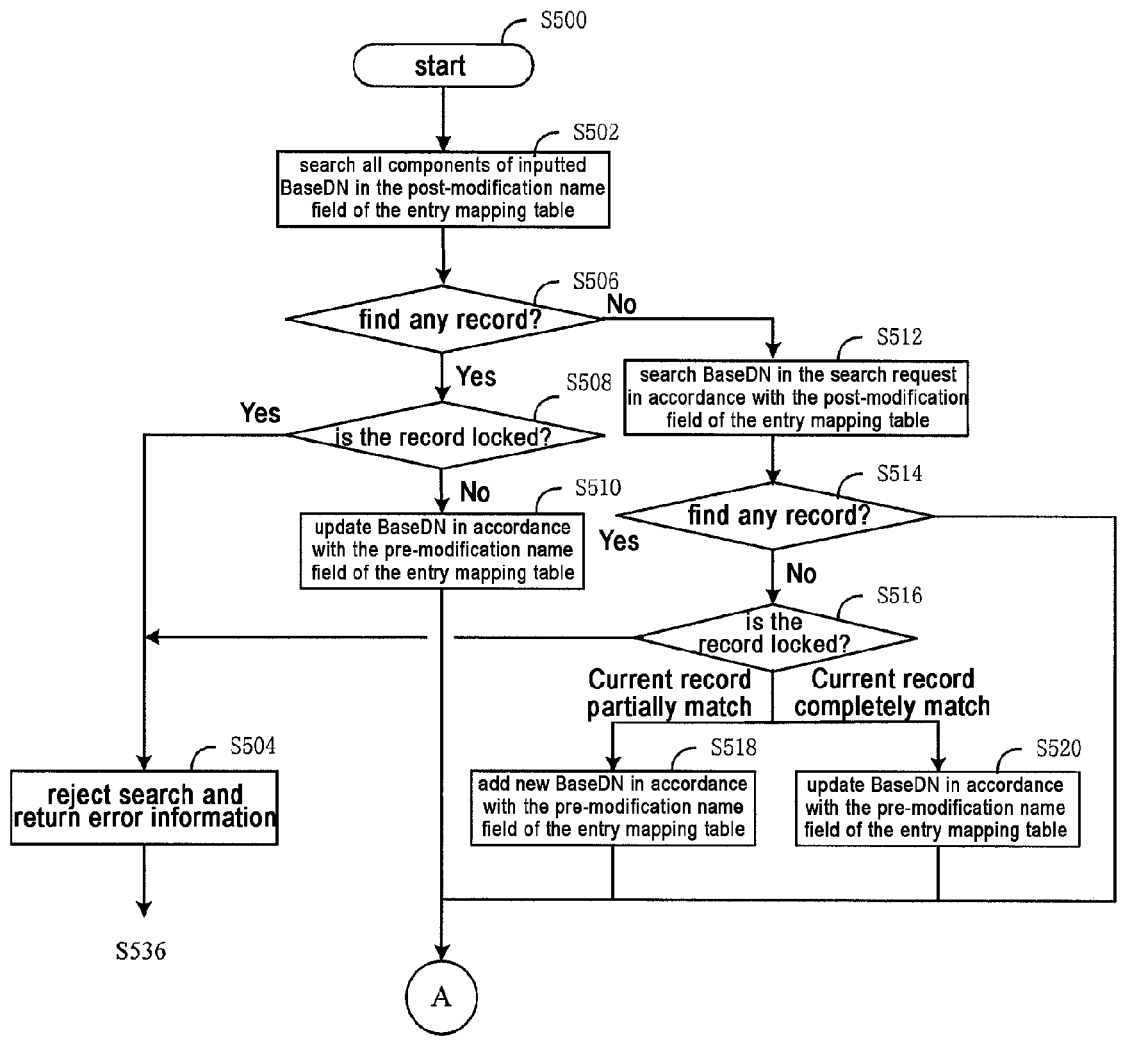
FIG. 5A shows a procedure of processing a search operation request using entry mapping data according to an embodiment of the present invention.
Figure 5B:
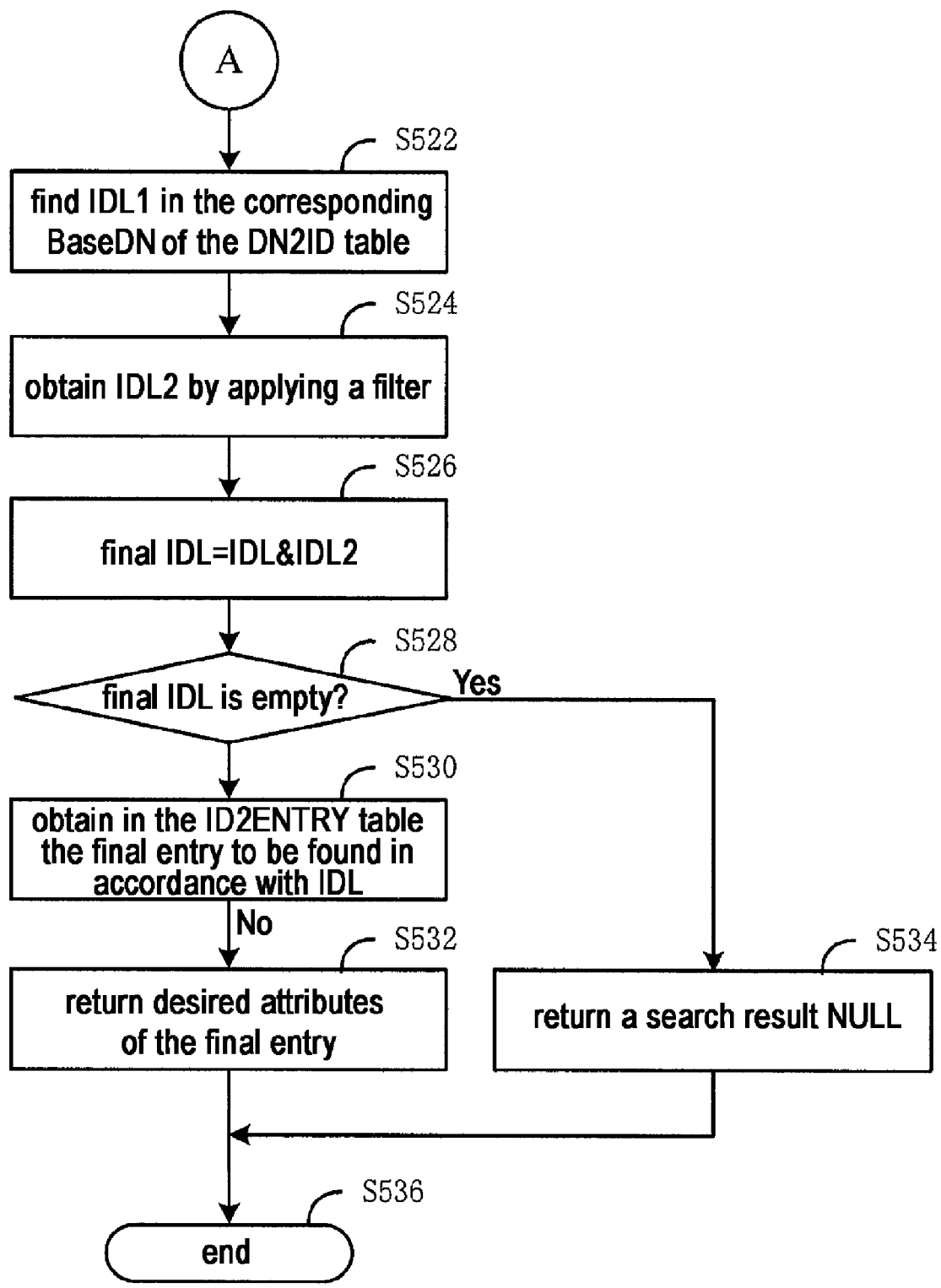
FIG. 5B shows a procedure of performing Search operation.

FIG. 5 shows a flowchart of processing Search operation of the directory database according to an embodiment of the present invention. FIG. 5A shows a procedure of processing a search operation request using entry mapping data according to an embodiment of the present invention; and FIG. 5B shows a procedure of performing Search operation based on the implementation of OpenLDAP BDB.

As shown in FIG. 5, in step S500, the user needs to perform search operation on the directory database of FIG. 2. Prior to this, modifying operation of entry names has been performed on the directory database, whereas the directory database has not been updated in accordance with the entry mapping table. The user inputs a search operation request including parameters such as BaseDN, Filter, Scope and Attributes, and then the processing starts.

Steps S502 to S510 are for processing the situation that BaseDN to be searched has ever been requested to perform Rename operation before.

In step S502, all components of input BaseDN are searched with respect to the records for Rename operations in the post-modification name field of the entry mapping table, in order to determine whether or not Rename operation was previously requested to perform on any component of BaseDN.

In step S506, it is determined whether or not a corresponding record is found.

If the determination result is "yes," it means that a request for Rename operation was previously made with respect to one or more components of BaseDN whereas the Rename operation has not been performed on the directory database, then the processing continues to perform step S508. If the determination result is "no," it means that no request for Rename operation is made with respect to any component of BaseDN, then the processing continues to perform step S512.

In step S508, it is determined whether or not the found record is locked. For example, in the example described in conjunction with table 6, when the value of the flag field is anything but "2", it is determined the record is not locked.

If the determination result is "yes," then the processing performs step S504. If the determination result is "no," then the processing performs step S510.

In step S504, because the found record is locked since the database is being updated, the present Search operation is rejected and error information is returned by, for example, sending a message to the user making the search operation request by the network interface of the directory server via the network.

In step S510, new BaseDN is generated in accordance with the pre-modification name field in the entry mapping table. That is, corresponding components of BaseDN in the search request are mapped to the contents of the pre-modification name field of the found record in the mapping table. In this manner, desired entries can be found in the directory database that has not bee updated with respect to these Rename operations.

In step S512, BaseDN in the search request is searched in the post-modification name field in the entry mapping table, in order to determine whether or not there is an entry for which Migrate operation has been requested and which matches the requested BaseDN.

In step S514, it is determined whether or not a record is found.

If the determination result is "no," it means there is no record associated with the entry to be searched in the entry mapping table, then the processing proceeds to place A. If the determination result is "yes," it means a request for Migrate operation was previously made with respect to BaseDN or its ancestor node (entry) whereas the Migrate operation has not been performed on the directory server.

In step S516, it is determined whether or not the found record is locked.

If the determined result is "yes," then the processing performs step S504. If the determination result is "no," the processing performs step S518 or S520.

When a name in the post-modification name field in the entry mapping table partially matches BaseDN in the search request (i.e. BaseDN is the same as a substring of that name from right to left), which means that a request for Migrate operation was previously made with respect to an ancestor node (entry) of BaseDN of the search operation, then in S518 new BaseDN is added in accordance with the name in the pre-modification name field of the entry mapping table. At this point, values of BaseDN based on which the Search operation is being performed include original BaseDN of the search operation request and the name in the pre-modification name field of the entry mapping table. Thus, it is ensured that search will be performed on subtrees before and after the corresponding entry migration while performing the search operation.

When a name in the post-modification name field of the entry mapping table completely matches BaseDN in the search request (i.e. that name is the same as BaseDN or the name is the same as a substring of BaseDN from right to left), which means that a request for Migrate operation was previously made with respect to the BaseDN node (entry) or with respect to a descendant node (entry) of BaseDN, then in step S520, BaseDN to use in search operation is updated in accordance with DN in the pre-modification name field of the entry mapping table. That is, if the name is the same as the BaseDN at this point, then the value of BaseDN in the search operation is updated as name in the pre-modification name field of the entry mapping table; if the name is the same as a substring of the BaseDN from right to left, a corresponding substring in BaseDN in the search operation is replaced as the name in the pre-modification name field of the entry mapping table. Thus, search can be performed on subtrees before the corresponding entry migration while performing the search operation.

After steps S518 and S520, the processing proceeds to place A.

For example, if the current entry mapping table is as shown in table 4, and parameters of the search request are: BaseDN: "G=2, D=marketing 1, O=A, C=CN;" Filter: unspecified; Scope: subtree search; Attributes: unspecified, then the generated new BaseDN is "G=2, D=marketing, O=A, C=CN" after the processing in accordance with the flow shown in FIG. 5A.

If the current entry mapping table is as shown in table 5, and parameters of the search request are: BaseDN: "G=1, D=marketing, O=A, C=CN;" Filter: unspecified; Scope: subtree search; Attributes: unspecified, then the generated new BaseDN is "G=1, D=marketing, O=A, C=CN" and "ID=22, G=2, D=marketing, O=A, C=CN" (current records partially match) after the processing in accordance with the flow shown in FIG. 5A. If the parameters of the search request are: BaseDN: "ID=22, G=1, D=market, O=A, C=CN;" Filter: unspecified; Scope: subtree search; Attributes: unspecified, then the generated new BaseDN is "ID=22, G=2, D=market, O=A, C=CN" (current records completely match) after the processing in accordance with the flow shown in FIG. 5A. If the parameters of the search request are: BaseDN: "ID=221, ID=22, G=1, D=marketing, O=A, C=CN;" Filter: unspecified; Scope: subtree search; Attributes: unspecified, then the generated new BaseDN is "ID=221, ID=22, G=2, D=marketing, O=A, C=CN" (current records completely match) after the processing in accordance with the flow shown in FIG. 5A.

The processing procedure after reference symbol A is shown in FIG. 5B, wherein the procedure of performing the search operation in accordance with the processed BaseDN is described in terms of the implementation of OpenLDAP BDB. For the purpose of clearness and succinctness, BaseDN mentioned in the following description is the BaseDN after the processing in accordance with the flow of FIG. 5A. That is, the BaseDN mentioned below refers to the new BaseDN updated through steps S510, S518 or S520 and the original BaseDN of the inputted search operation when the determination result is "no" in step S514.

As shown in FIG. 5B, in step S522, IDL1 of the corresponding BaseDN is found in the DN2ID table.

In step S524, IDL2 is obtained through the filter.

In step S526, IDL1 and IDL2 are subject to the "AND" operation to obtain the final IDL.

In step S528, it is determined whether or not the final IDL is empty.

If the determination result is "yes," the processing continues to perform step S534. If the determination result is "no," the processing continues to perform steps S530 to S532.

In step S534, the "NULL" search result is returned by, for example, sending a message to the user making the search request by the network interface of the directory server via the network.

In step S530, in accordance with the IDL, the final entry to be searched is obtained in the ID2ENTRY table.

In step S532, the desired attribute of the final entry is returned by, for example, sending a message to the user making the search request by the network interface of the directory server and via the network.

The processing ends in step S536.

It should be pointed out that FIGS. 3-5 are not general processing flows covering all embodiments of the present invention, but are processing flows designed for the specific configuration of entry mapping table. Those skilled in the art can design other different configurations to indicate entry mapping information in accordance with concrete demands, and modify, add or omit processing steps in FIGS. 3-5 based on these different configurations to indicate entry mapping information.

Additionally, the processing flows in FIGS. 3-5 are based on the implementation of the directory database OpenLDAP BDB. However, it will be appreciated that the implementation of the present invention does not depend on a specific implementation of the directory database. In other words, various embodiments of the present invention can be effectively applied to various implementation of a directory database and improve the performance of modify entry name operation of a directory database.

FIG. 6 schematically shows a block diagram of a directory server according to an embodiment of the present invention.

In FIG. 6, reference numeral 600 denotes a directory server according to an embodiment of the present invention, 602 directory database storage means for storing the directory database, 604 operation processing means for processing an operation request of the directory database, 606 a network interface for communicating with a network in order to send to or receive from a user an operation request, 608 entry mapping maintenance and processing means, and 610 entry mapping data storage means for storing entry mapping information before and after modifying operation of entry names.

As shown in FIG. 6, directory server 600 receives an operation request for the directory database. For example, directory server 600 can receive an operation request from a user by network interface 606 via the network.

When an operation request network interface 606 receives is a request for modifying operation of entry names, entry mapping maintenance and processing means 608 modifies entry mapping data stored in entry mapping data storage means 610 according to the contents of the request for modifying operation of entry names. In particular, in an example, entry mapping data storage means 610 can store an entry mapping table as shown in table 3. Where the request for modifying operation of entry names is a request for Rename operation, entry mapping maintenance and processing means 608 can execute a processing flow as shown in FIG. 3 to update the entry mapping table in entry mapping data storage means 610. Where the request for modifying operation of entry names is a request for Migrate operation, entry mapping maintenance and processing means 608 can execute a processing flow as shown in FIG. 4 to update the entry mapping table in entry mapping data storage means 610.

According to a preset modification condition, entry mapping maintenance and processing means 608 determines whether or not the directory database stored in directory database storage means 602 needs to be currently modified in accordance with entry mapping data in entry mapping database storage means 610. Depending on different applications, specific conditions can be set so as to perform the determination. For example, a certain period of time can be predetermined, for example, the modification is performed after 12:00 p.m. Or a certain modification workload threshold can be predetermined and the directory database is modified upon for example reaching this modification workload threshold. In particular, according to an advantageous implementation of the present invention, it can be set if a record, which corresponds to the currently requested modifying operation of entry names, has existed in the entry mapping table, it is determined that the directory database needs to be modified according to current entry mapping data.

If entry mapping maintenance and processing means 608 determines that the predetermined modification condition is met, then entry mapping data in entry mapping data storage means 610 is provided to operation processing means 604 that modifies in a batch manner corresponding entries in dependence on the implementation of the directory database. Upon completion of the modification, entry mapping maintenance and processing means 608 deletes corresponding data stored in entry mapping data storage means 610.

When an operation request network interface 606 receives a request for Search operation, entry mapping maintenance and processing means 608 searches entry mapping data stored in entry mapping data storage means 610 according to the contents of the request for Search operation, and determines whether or not mapping data corresponding to the Search request is found. If mapping data corresponding to the Search request is found, entry mapping maintenance and processing means 608 provides it to operation processing means 604, which searches the directory database with reference to corresponding data of the entry mapping data. In particular, in an example, entry mapping maintenance and processing means 608 can, for example in accordance with the flow shown in FIG. 5A, determines new search operation parameter BaseDN on the basis of entry mapping data stored in entry mapping data storage means 610 and provide new BaseDN to operation processing means 604. Operation processing means 604, for example according to the processing flow shown in FIG. 5B, can obtain a corresponding search result in the directory database in directory database storage means 602 and return the search result to the user via network interface 606.

FIG. 7 schematically depicts a computer device in which the embodiments according to the present invention may be implemented.

The computer system depicted in FIG. 7 comprises a CPU (Central Processing Unit) 701, RAM (Random Access Memory) 702, ROM (Read Only Memory) 703, a system bus 704, a Hard Disk controller 705, a keyboard controller 706, a serial interface controller 707, a parallel interface controller 708, a display controller 709, a hard disk 710, a keyboard 711, a serial external device 712, a parallel external device 713 and a display 714. Among these components, connected to system bus 704 are CPU 701, RAM 702, ROM 703, HD controller 705, keyboard controller 706, serial interface controller 707, parallel interface controller 708 and display controller 709. Hard disk 710 is connected to HD controller 705, and keyboard 711 to keyboard controller 706, serial external device 712 to serial interface controller 707, parallel external device 713 to parallel interface controller 708, and display 714 to display controller 709.

The functions of each component in FIG. 7 are well known in the art, and the architecture depicted in FIG. 7 is conventional. In different applications, some components may be added to the architecture depicted in FIG. 7, or some of the components depicted in FIG. 7 may be omitted. The whole system depicted in FIG. 7 is controlled by computer readable instructions, which are usually stored as software in hard disk 710, EPROM or other non-volatile memory. The software can also be downloaded from the network (not depicted in the figure). The software, either stored in hard disk 710 or downloaded from the network, can be loaded into RAM 702, and executed by CPU 701 for implementing the functions defined by the software.

As the computer system depicted in FIG. 7 is able to support the solution of enabling modifying operation of entry names in a directory server according to the present invention, the computer system merely serves as an example of computer systems. Those skilled in the art may understand that many other computer system designs are also able to carry out the embodiments of the present invention.

The present invention may further be implemented as a computer program product used by, for example the computer system depicted in FIG. 7, which contains code for implementing the method of enabling modifying operation of entry names in a directory server according to the present invention. The codes may be stored in a memory of other computer system prior to the usage. For instance, the code may be stored in a hard disk or a removable memory like an optical disk or a floppy disk, or may be downloaded via the Internet or other computer network.

As the embodiments of the present invention have been described with reference to the accompanying drawings, various modifications or alterations may be made by those skilled in the art within the scope as defined by the appended claims.

What is claimed is:

1. A computer-implemented method for modifying an entry name in a directory server, comprising:
   modifying entry mapping information in a directory database, in response to a request to modify at least one entry name, wherein each piece of entry mapping information is used for indicating a correspondence relation between pre-modification entry name information and post-modification entry name information;
   wherein the entry mapping information is recorded in an entry mapping information table, and each record of the entry mapping information table includes a pre-modification name field and a post-modification name field;

asynchronously performing a modifying operation of the entry name in accordance with respective pieces of entry mapping information when a predetermined condition for updating the directory database is met;

wherein the predetermined condition for updating includes at least one:

asynchronously performing modifying operation of entry names in a specific period of time; and asynchronously performing modifying operation of entry names when a modification workload reaches a predetermined threshold;

searching entries of the directory database and the post-modification name field of the entry mapping table in order to determine whether or not there is an entry name that are a same as the entry name after a requested modification;

searching, in response to a result that no entry name that is the same as the entry name after the modification that is requested is found, the pre-modification name field of the entry mapping table in order to determine whether or not there is a entry name that is the same as the entry name before the modification that is requested; and adding, in response to the result that no entry name that is the same as the entry name before the requested modification is found, a new mapping record to the entry mapping table, wherein the pre-modification name field of the record records information associated with the entry name before the requested modification, and the post-modification name field records information associated with the entry name after the requested modification.

2. The computer-implemented method according to claim 1, further comprising:

deleting entry mapping information corresponding to modifying operations of entry names that have been performed.

3. The computer-implemented method according to claim 1, further comprising:

performing, in response to a search operation request, search operation on the directory database in accordance with the entry mapping information.

4. The computer-implemented method according to claim 1, wherein each record of the entry mapping information table further includes a flag field for indicating a type of modifying operation of entry names corresponding to the record and for indicating whether or not the corresponding modifying operation of entry names is currently being performed asynchronously in accordance with the record.

5. The computer-implemented method according to claim 4, wherein the condition for updating includes:

if a record corresponding to the entry involved in a currently requested modifying operation of entry names has existed in the entry mapping table, at least asynchronously performing modifying operation of entry names in accordance with the record.

6. The computer-implemented method according to claim 1, comprising:

re-determining, in response to a search operation request, parameters for search operation on the directory database in accordance with the entry mapping table, the parameters including BaseDN;

performing search operation on the directory database based on the parameters for the search operation which have been determined; and returning a search operation result.

7. The computer-implemented method according to claim 6, wherein the modifying operation of entry names includes a type of Rename operation and Migrate operation.

8. A directory server comprising:

a directory database storage means for storing a directory database;

operation processing means for processing a request for operation on the directory database;

entry mapping information storage means for storing entry mapping information, wherein each piece of entry mapping information is used for indicating a correspondence relation between pre-modification entry name information and post-modification entry name information;

wherein the entry mapping information is recorded in an entry mapping information table, and each record of the entry mapping information table includes a pre-modification name field and a post-modification name field;

entry mapping maintenance and processing means for receiving a request to modify a set of entry names, and modifying, prior to modifying the set of entry names, entry mapping information in accordance with the request the set of entry names, and for providing entry mapping information to the operation processing means when a preset condition for updating the directory database is met, so as to asynchronously perform a modifying operation of a corresponding entry name in accordance with respective pieces of entry mapping information when a predetermined condition for updating the directory database is met wherein the predetermined condition for updating includes at least one of:

asynchronously performing modifying operation of entry names in a specific period of time; and asynchronously performing modifying operation of entry names when a modification workload reaches a predetermined threshold;

searching entries of the directory database and the post-modification name field of the entry mapping table in order to determine whether or not there is an entry name that are the same as the entry name after a requested modification;

wherein the entry mapping maintenance and processing means is further configured for:

searching, in response to a result that no entry name that is the same as the entry name after the modification that is requested is found, the pre-modification name field of the entry mapping table in order to determine whether or not there is a entry name that is the same as the entry name before the modification that is requested; and adding, in response to the result that no entry name that is the same as the entry name before the modification that is requested is found, a new mapping record to the entry mapping table, wherein the pre-modification name field of the record records information associated with the entry name before the modification that is requested, and the post-modification name field records information associated with the entry name after the modification that is requested.

9. The directory server according to claim 8, wherein the entry mapping maintenance and processing means is further configured for deleting entry mapping information corresponding to modifying operations of entry names that have been performed.

10. The directory server according to claim 8, wherein the entry mapping maintenance and processing means is further configured for performing, in response to a search operation request, search operation on the directory database in accordance with the entry mapping information.

11. The directory server according to claim 8, wherein each record of the entry mapping information table further includes a flag field for indicating a type of modifying operation of entry names corresponding to the record and for indicating whether or not the corresponding modifying operation of entry names is currently being performed asynchronously in accordance with the record.

12. The directory server according to claim 11, wherein the condition for updating includes:
   if a record corresponding to the entry involved in a currently requested modifying operation of entry names has existed in the entry mapping table, at least asynchronously performing modifying operation of entry names in accordance with the record.

13. The directory server according to claim 8, wherein the entry mapping maintenance and processing means is further configured for re-determining, in response to a search operation request, parameters for search operation on the directory database in accordance with the entry mapping table, the parameters including BaseDN; and the operation processing means is further for
   performing search operation on the directory database based on the parameters for the search operation which have been determined; and
   returning a search operation result.

14. The directory server according to claim 13, wherein the modifying operation of entry names includes a type of Rename operation and Migrate operation.

* * * * *